(12) United States Patent
Sano

(10) Patent No.: US 9,493,645 B2
(45) Date of Patent: Nov. 15, 2016

(54) TUBE FOR FLUID TRANSPORTATION

(75) Inventor: Ryosuke Sano, Kanagawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1051 days.

(21) Appl. No.: 12/300,217

(22) PCT Filed: May 11, 2007

(86) PCT No.: PCT/JP2007/059724
§ 371 (c)(1),
(2), (4) Date: Dec. 5, 2008

(87) PCT Pub. No.: WO2007/132759
PCT Pub. Date: Nov. 22, 2007

(65) Prior Publication Data
US 2010/0233400 A1    Sep. 16, 2010

(30) Foreign Application Priority Data

May 12, 2006  (JP) ................... 2006-134228
Oct. 31, 2006  (JP) ................... 2006-295964

(51) Int. Cl.
*B32B 1/08*    (2006.01)
*C08L 53/02*   (2006.01)
*F16L 11/04*   (2006.01)

(52) U.S. Cl.
CPC ............... *C08L 53/02* (2013.01); *F16L 11/04* (2013.01); *Y10T 428/1372* (2015.01)

(58) Field of Classification Search
CPC ............ C08L 9/06; C08L 2666/54; C08L 53/02; C08K 3/04; F16L 11/04; Y10T 428/1372
USPC .............. 428/35.7, 36.8, 36.4; 138/118
See application file for complete search history.

(56) References Cited

U.S. PATENT DOCUMENTS

| | | | | |
|---|---|---|---|---|
| 4,501,842 A * | 2/1985 | Chmiel et al. | ................ | 524/432 |
| 5,118,748 A * | 6/1992 | Fujita et al. | ................ | 524/436 |
| 5,498,372 A * | 3/1996 | Hedges | ................ | 252/511 |
| 5,814,697 A * | 9/1998 | Akao et al. | ................ | 524/495 |
| 5,827,584 A * | 10/1998 | Akao et al. | ................ | 428/35.7 |
| 6,090,459 A * | 7/2000 | Jadamus et al. | ................ | 428/36.4 |
| 6,166,143 A * | 12/2000 | Watanabe et al. | ................ | 525/208 |
| 6,395,199 B1 * | 5/2002 | Krassowski et al. | ................ | 427/470 |
| 6,410,109 B1 * | 6/2002 | Shachi et al. | ................ | 428/36.6 |
| 6,428,866 B1 * | 8/2002 | Jadamus et al. | ................ | 428/36.4 |
| 6,559,234 B1 * | 5/2003 | Arai et al. | ................ | 525/245 |
| 6,730,381 B2 * | 5/2004 | Horacek | ................ | 428/36.8 |
| 6,793,997 B2 * | 9/2004 | Schmitz | ................ | 428/36.9 |
| 7,132,141 B2 * | 11/2006 | Thullen et al. | ................ | 428/36.91 |
| 7,172,796 B2 * | 2/2007 | Kinoshita et al. | ................ | 428/36.3 |
| 7,267,855 B2 * | 9/2007 | Handlin et al. | ................ | 428/34.1 |
| 7,308,912 B2 * | 12/2007 | Watanabe et al. | ................ | 138/137 |
| 7,604,049 B2 * | 10/2009 | Vaidya et al. | ................ | 166/244.1 |
| 7,892,455 B2 * | 2/2011 | Bradley et al. | ................ | 252/511 |
| 8,110,026 B2 * | 2/2012 | Prud'Homme et al. | ................ | 96/4 |
| 2004/0127621 A1 * | 7/2004 | Drzal et al. | ................ | 524/424 |
| 2004/0226643 A1 * | 11/2004 | Yagi et al. | ................ | 152/510 |
| 2005/0003180 A1 * | 1/2005 | Kondos | ................ | 428/324 |
| 2005/0020881 A1 * | 1/2005 | Hosoi et al. | ................ | 600/140 |
| 2005/0061381 A1 * | 3/2005 | Hosoi et al. | ................ | 138/137 |
| 2005/0187355 A1 | 8/2005 | Tasaka et al. | | |
| 2005/0187455 A1 | 8/2005 | Rashidi | | |
| 2006/0172097 A1 * | 8/2006 | Morikoshi et al. | ................ | 428/35.7 |
| 2009/0087607 A1 * | 4/2009 | Noda et al. | ................ | 428/36.9 |

FOREIGN PATENT DOCUMENTS

| | | |
|---|---|---|
| CN | 1657564 A | 8/2005 |
| EP | 0 476 202 A1 | 3/1992 |
| JP | 59-123661 A | 7/1984 |
| JP | 60-011388 | 1/1985 |
| JP | 62-112635 A | 5/1987 |
| JP | 2-286331 A | 11/1990 |
| JP | 60-11388 A | 1/1994 |
| JP | 2003-286384 A | 10/2003 |
| JP | 2004-018806 A | 1/2004 |
| JP | 2004-339288 A | 12/2004 |
| JP | 2005-264139 A | 9/2005 |
| JP | 2005-319608 A | 11/2005 |
| JP | 2006-175631 A | 7/2006 |
| WO | 2005/103146 A1 | 11/2005 |

OTHER PUBLICATIONS

Wypych, George (2000). Handbook of Fillers—A Definitive User's Guide and Databook (2nd Edition) . . . ChemTec Publishing.*
"SteamTable," M.D Koretsky, "Engineering and Chemical Thermodynamics", John Wiley and Sons, 2004, p. 1-16.*

* cited by examiner

*Primary Examiner* — Gwendolyn Blackwell
*Assistant Examiner* — Kevin Ortman, Jr.
(74) *Attorney, Agent, or Firm* — Sughrue Mion, PLLC

(57) ABSTRACT

The present invention provides a tube for transporting a fluid comprising a composition containing 100 parts by mass of (A) a thermoplastic elastomer and 1 to 500 parts by mass of (B) a carbon base filler, and it has a low vapor permeability and is excellent in an air permeation resistance and a flexibility.

3 Claims, No Drawings

TUBE FOR FLUID TRANSPORTATION

BACKGROUND OF THE INVENTION

The present invention relates to a tube for transporting a fluid, more specifically to a tube for transporting a fluid which is reduced in a vapor permeability and excellent in an air permeation resistance and a flexibility by using a thermoplastic elastomer as a base material and adding a carbon base filler to the above base material.

RELATED ART

Materials which are excellent in an air permeation resistance are required in many industrial fields from the viewpoints of environmental maintenance and quality control. For example, in a tube for transporting a coolant of an air conditioning system, it is important that a refrigerant gas is inhibited from permeating from the viewpoint of environmental problems. In addition thereto, transporting tubes used for gas transporting, chemical medicines, medical care, beverage transporting and the like are required as well to have a high air permeation resistance from the viewpoint of a safety and the like. Further, not only they are required to have a vapor permeation resistance, a gas resistance, a corrosion resistance and a chemical resistance, but also the above transporting tubes are requested to have a flexibility such as a bending resistance and the like, and transporting tubes of a high performance which are excellent as well in a vibration absorbing property and an installing workability are demanded.

Vinyl chloride resins and silicone resins have so far been used as raw materials for the above tubes, but they have some kind of defects and are not necessarily sufficiently satisfactory. In the case of, for example, vinyl chloride resin base tubes, the problems that plasticizers bleed out and that they have a low durability have been involved therein. Further, the tubes of the silicone resins are excellent in performances such as a durability, a chemical resistance and the like, but the problems that they have a low mechanical strength (particularly a tearing strength) and that they are expensive have been involved therein.

In recent years, polystyrene base thermoplastic elastomers represented by styrene-ethylene/propylene block copolymers (SEPS), styrene-ethylene/butylene-styrene block copolymers (SEBS) and styrene-isobutylene-styrene block copolymers (SIBS) are developed as tube materials.

In fact, they are excellent in a mechanical strength and a flexibility but have involved the problem that they are not necessarily satisfactory in terms of a vapor permeation resistance and a gas permeation resistance.

On the other hand, disclosed as methods for enhancing a gas permeation resistance of a rubber hose are, for example, (1) a method in which a nylon film is coated on an inner face of a rubber hose (refer to, for example, a patent document 1) and (2) a method in which rubber is coated on an inner tube made of nylon to form a hose (refer to, for example, a patent document 2).

In any of the above methods, however, the gas permeation resistance is not satisfactory, and the problem that it is difficult to continuously produce rubber hoses has been involved particularly in the method of (1).

Further, though not a case of a rubber hose, known is a method in which a coating film of organosilane is used as a gas barrier film in order to enhance a gas permeation resistance of a plastic film (refer to for example, patent documents 3 and 4).

In the above method, however, it has been difficult to apply an organosilane coating film as a gas barrier film to hose use in which large deformation is involved.

On the other hand, in the fields of high polymers, particularly packaging film materials, known as methods for enhancing a barrier property are improvement in a molecular structure of high polymers, multilayering such as dry lamination carried out by using adhesives and extrusion lamination carried out by a melt adhering method, turning into nanocomposite in which an inorganic compound is finely dispersed in a high polymer in a nanoorder and surface modifying methods such as resin coating (an emulsion method and a resin method) and inorganic material coating (vapor deposition).

However, it has become clear that when the methods of multilayering and turning into nanocomposite each described above are applied to, for example, the polystyrene base thermoplastic elastomer base material described above, a flexibility of the thermoplastic elastomer is lost and that in a resin coating, a resin to be coated is less liable to be fixed on the surface of the above polystyrene base thermoplastic elastomer base material.

Further, a liquid supplying tube in which a film of diamond-like carbon (DLC) having a high air permeation resistance is formed on an inner face is proposed for the purpose of stably supplying a liquid ink (refer to, for example, Claim 7 of a patent document 5). Also, it is disclosed as well to use a synthetic thermoplastic resin as a material for a liquid supplying tube (refer to, for example, Claim 9 of the patent document 5).

However, since the thermoplastic resin is not specifically disclosed in the above patent document, an adhesive property of the DLC film is unclear, and there is the possibility that the DLC film is peeled off. In addition thereto, the DLC film is used on an inner face of the liquid supplying tube, and therefore there is the possibility that the DLC film is peeled off by a change of pressure in the liquid supplying tube and flows in the fluid.

In any cases, it is possible, as described above, to improve a certain part of the performances, but means and steps for improving various performances are complicated, and desired to be developed is a tube for supplying a fluid which can satisfy performances, for example, various performances such as an air permeation resistance, a vapor permeation resistance, a flexibility and the like at the same time by an easier method.

Patent document 1: Japanese Patent Application Laid-Open No. 123661/1984

Patent document 2: Japanese Patent Application Laid-Open No. 11388/1985

Patent document 3; Japanese Patent Application Laid-Open No. 112635/1987

Patent document 4: Japanese Patent Application Laid-Open No. 286331/1990

Patent document 5: Japanese Patent Application Laid-Open No. 319608/2005

DISCLOSURE OF THE INVENTION

An object of the present invention is to provide a tube for transporting a fluid which is reduced in a vapor permeability and excellent in an air permeation resistance and a flexibility by using a thermoplastic elastomer as a base material and adding a carbon base filler to the above base material.

Intensive investigations repeated by the present inventors in order to achieve the object described above have resulted in finding that the object described above can be achieved by a tube for transporting a fluid prepared by using a composition obtained by using a specific thermoplastic elastomer as a base material and adding a specific filler to the above base material. The present invention has been completed based on the above knowledge.

That is, the present invention provides;
(1) a tube for transporting a fluid comprising a composition containing 100 parts by mass of (A) a thermoplastic elastomer and 1 to 500 parts by mass of (B) a carbon base filler,
(2) the tube for transporting a fluid according to (1) described above, wherein the carbon base filler of the component (B) is powder-shaped and/or flat-shaped graphite,
(3) the tube for transporting a fluid according to (2) described above, wherein the carbon base filler of the component (B) is flat-shaped graphite,
(4) the tube for transporting a fluid according to (2) described above, wherein the powder-shaped graphite has an average particle diameter of 1 to 500 μm,
(5) the tube for transporting a fluid according to (2) or (3) described above, wherein the flat-shaped graphite has an average particle diameter of 1 to 500 μm, and a flat rate thereof is 1≤flat rate≤1000,
(6) the tube for transporting a fluid according to (1) described above, wherein the composition containing the thermoplastic elastomer of the component (A) and the carbon base filler of the component (B) is a composition further containing 0.1 to 50 parts by mass of a polyolefin resin based on 100 parts by mass of the above thermoplastic elastomer,
(7) the tube for transporting a fluid according to (1) or (6) described above, wherein the thermoplastic elastomer of the component (A) is a polystyrene base thermoplastic elastomer in which a principal chain of a soft segment comprises a saturated bond,
(8) the tube for transporting a fluid according to (7) described above, wherein the polystyrene base thermoplastic elastomer of the component (A) is at least one selected from the group consisting of a styrene-isobutylene-styrene block copolymer (SIBS), a styrene-ethylene/butylene-styrene block copolymer (SEBS) and a styrene-ethylene/propylene-styrene block copolymer (SEPS),
(9) the tube for transporting a fluid according to any of (1) to (8) described above, wherein an air permeability is $120 \times 10^{-5}$ $cm^3/m^2 \cdot 24$ hr·Pa or less based on a sheet having a thickness of 0.5 mm and
(10) the tube for transporting a fluid according to any of (1) to (9) described above, wherein a vapor permeability is 1.2 $cm^3/m^2 \cdot 24$ hr or less based on a sheet having a thickness of 0.5 mm.

BEST MODE FOR CARRYING OUT THE INVENTION

First, the tube of the present invention for transporting a fluid is characterized by comprising a composition containing 100 parts by mass of (A) a thermoplastic elastomer and 1 to 500 parts by mass of (B) a carbon base filler.

The fluid is a generic term of a gas and a liquid, and the tube for transporting a fluid can be applied as a tube for a gas and a liquid.

The thermoplastic elastomer of the component (A) used in the present invention shall not specifically be restricted and is suitably selected from publicly known thermoplastic elastomers according to the uses of the high molecular composite, and it is preferably a material having a high flexibility from the viewpoint of a bending resistance. The above thermoplastic elastomer includes, for example, polystyrene base thermoplastic elastomers, polyolefin base thermoplastic elastomers, polydiene base thermoplastic elastomers, polyvinyl chloride base thermoplastic elastomers, chlorinated polyethylene base thermoplastic elastomers, polyurethane base thermoplastic elastomers, polyester base thermoplastic elastomers, polyamide base thermoplastic elastomers, fluororesin base thermoplastic elastomers and the like.

In the present invention, the above thermoplastic elastomers may be used alone or in combination of two or more kinds thereof, and the polystyrene base thermoplastic elastomers are particularly preferred from the viewpoints of balance between physical properties and a processing property.

The polystyrene base thermoplastic elastomer comprises an aromatic vinyl base polymer block (hard segment) and a rubber block (soft segment), and the aromatic vinyl base polymer block forms physical cross-linking to become a cross-linking point. On the other hand, the rubber block provides an elasticity.

The examples of an aromatic vinyl base compound forming the aromatic vinyl base polymer block include styrene; α-alkyl-substituted styrenes such as α-methylstyrene, α-ethylstyrene, α-methyl-p-methylstyrene and the like; ring alkyl-substituted styrenes such as o-methylstyrene, m-methylstyrene, p-methylstyrene, 2,4-dimethylstyrene, ethylstyrene, 2,4,6-trimethylstyrene, o-t-butylstyrene, p-t-butylstyrene, p-cyclohexylstyrene and the like; ring halogenated styrenes such as o-chlorostyrene, m-chlorostyrene, p-chlorostyrene, p-bromostyrene, 2-methyl-4-chlorostyrene and the like; vinylnaphthalene derivatives such as 1-vinylnaphthalene and the like; indene derivatives; divinylbenzene and the like.

Among them, styrene, α-methylstyrene and p-methylstyrene are preferred, and styrene is particularly suited.

The above aromatic vinyl compounds may be used alone or in combination of two or more kinds thereof.

The above polystyrene base thermoplastic elastomer includes styrene-butylene-styrene block copolymers (SBS), styrene-isoprene-styrene block copolymers (SIS), styrene-isobutylene-styrene block copolymers (SIBS), styrene-ethylene/butylene-styrene block copolymers (SEBS), styrene-ethylene/propylene block copolymers (SEPS), block copolymers of crystalline polyethylene with ethylene/butylene-styrene random copolymers which are obtained by hydrogenating block copolymers of polybutadiene with butadiene-styrene random copolymers and diblock copolymers of, for example, crystalline polyethylene with polystyrene which are obtained by hydrogenating block copolymers of polybutadiene or ethylene-butadiene random copolymers with polystyrene, according to the arrangement style of a soft segment therein.

Among them, the copolymers in which a soft segment does not contain a double bond, that is, the copolymers in which a principal chain of a soft segment comprises a saturated bond are preferably used from the viewpoints of a mechanical strength, a gas permeation resistance, a thermal stability, a weatherability, a chemical resistance, a degradation resistance, a flexibility, a processing property and the like. To be specific, preferred are styrene-isobutylene-styrene block copolymers (SIBS), styrene-ethylene/butylene-styrene block copolymers (SEBS) and styrene-ethylene/propylene block copolymers (SEPS). A content of a styrene block in the above styrene base elastomers falls in a range of is preferably 10 to 70% by mass, more preferably 20 to 40% by mass.

The thermoplastic elastomers described above have a hardness of preferably 80 degree or less according to a JIS-A standard. If the hardness is 80 degree or less, the molding is provided with a satisfactory flexibility. From the viewpoint described above, the hardness is more preferably 70 degree or less, particularly preferably 60 degree or less according to the JIS-A standard.

A weight average molecular weight of the thermoplastic elastomers described above shall not specifically be restricted, and it falls in a range of preferably 40,000 to 120,000, more preferably 60,000 to 100,000 from the viewpoints of a gas permeation resistance, a mechanical strength and a moldability.

The composition (hereinafter referred to as the elastomer composition) containing the thermoplastic elastomer can be blended with various matters as components other than the thermoplastic elastomer. Resin components (hereinafter referred to merely as the resin components) such as polyolefin resins, polystyrene resins and the like can suitably be given from the viewpoint of enhancing a processing property and a heat resistance of the above elastomer composition, and the polyolefin resins are particularly preferred.

The polyolefin resins shall not specifically be restricted and include, for example, polyethylene, isotactic polypropylene and copolymers of propylene with a small amount of other α-olefins (for example, propylene-ethylene copolymers and propylene/4-methyl-1-pentene copolymers), poly (4-methyl-1-pentene), polybutene-1 and the like). When isotactic polypropylene or a copolymer thereof is used as the polyolefin resin, the resins in which MFR (JIS K7210) falls in a range of 0.1 to 50 g/10 minutes, particularly 0.5 to 30 g/10 minutes can suitably be used.

The thermoplastic elastomer contained in the elastomer composition can be used alone or in combination of two or more kinds thereof.

Next, resins obtained by publicly known production processes, for example, resins obtained by both of a radical polymerization process and an ion polymerization process can suitably be used as the polystyrene resin.

A number average molecular weight of the polystyrene resin used above can be selected from a range of preferably 5,000 to 500,000, more preferably 10,000 to 200,000, and the molecular weight distribution is preferably 5 or less.

The polystyrene resin includes, for example, polystyrene, styrene-butadiene block copolymers having a styrene unit content of 60% by mass or more, rubber-reinforced polystyrene, poly-α-methylstyrene, poly-p-t-butylstyrene and the like, and they may be used alone or in combination of two or more kinds thereof.

Further, copolymers obtained by polymerizing a mixture of monomers constituting the above polymers can be used as well.

Also, the polyolefin resins and the polystyrene resins each described above can be used in combination.

For example, in a case where the polystyrene resin is used in combination when the above resins are added to the elastomer composition, a molding obtained tends to have a higher hardness as compared with in a case where the polyolefin resin alone is added.

Accordingly, selection of the above blending ratios makes it possible to control as well a hardness of the molding obtained.

In this case, a ratio of the polyolefin resin/the polystyrene is selected preferably from a range of 95/5 to 5/95 (mass ratio).

A blending amount of the resin components contained in the elastomer composition is preferably 0 to 100 parts by mass based on 100 parts by mass of the thermoplastic elastomer, and in the case of, for example, the polyolefin resin, it is particularly preferably 0.1 to 50 parts by mass.

If a blending amount of the resin components is 100 parts by mass or less, a hardness of the molding obtained does not grow too high, and therefore it is preferred.

The elastomer composition according to the present invention has to contain 100 parts by mass of the thermoplastic elastomer of the component (A) and 1 to 500 parts by mass of the carbon base filler of the component (B). A more preferred content of the component (B) is 1 to 100 parts by mass.

Controlling a content of the component (B) based on the component (A) to the range described above makes it possible to maintain a flexibility of the tube and improve an air permeation resistance and a vapor permeation resistance thereof.

The carbon base filler of the component (B) shall not specifically be restricted, and capable of being used are carbon black, graphite powder, anthracite coal and calcined anthracite coal which are crushed, fullerene, carbon nanotubes, carbon nanofibers, carbon short fibers, glassy carbon and composites of two or more kinds thereof. Among them, graphite powder is preferably used.

Graphite includes natural graphite and artificial graphite, and the natural graphite includes scale-like graphite having a high crystallinity, massive graphite, soil graphite having a little low crystallinity, artificial graphite obtained by heating (graphitization) amorphous carbon at 2500 to 3000° C. and thermally decomposed graphite having a high crystallinity which is obtained by heating a base material of graphite at high temperature (2100° C.) in hydrocarbon atmosphere to thereby deposit on a base material surface by decomposition polymerization of hydrocarbon.

A crystal of graphite has a stratiform structure, and an inside of a layer face comprises a plane in which carbon atoms are bonded by virtue of a covalent bond. In contrast with this, an interlayer bond is a bond by virtue of a van der Waals force, and as a result thereof, a graphite crystal has a form in which planes are superposed one after another, so that graphite has anisotropy in which a form is notably different according to a direction. Since the layers are bonded only by a van der Waals force, an interlayer bonding force is weak, and a self-lubricating property is exhibited. When the resin is kneaded with graphite, the above self-lubricating property allows the layers to be separated from each other and dispersed in the resin in a flat form, whereby the air permeation resistance and the vapor permeation resistance are enhanced.

Further, graphite powder is excellent in electric and thermal conductivities, a chemical resistance, an abrasion resistance and a heat resistance as well as a self-lubricating property, and it has an affinity with the thermoplastic elastomer and the like and is excellent in a processing property, so that it is preferred.

The form of graphite shall not specifically be restricted, and powder-shaped and/or flat graphites are preferably used, and among them, the flat graphite is preferred.

The powder-shaped graphite described above has an average particle diameter of preferably 1 to 500 μm, more preferably 1 to 100 μm.

The flat graphite described above has an average particle diameter of preferably 1 to 500 μm, more preferably 1 to 100 μm. Further, the flat graphite has a flat rate of 1≤flat rate≤1000, more preferably 1≤flat rate≤500.

The respective graphites having an average particle diameter controlled to the ranges described above make it possible to maintain mechanical characteristics such as a breaking strength (TB) and a breaking elongation (Eb) of the elastomer composition and secure an excellent dispersibility of graphite to the thermoplastic elastomer.

Further, the air permeation resistance and the vapor permeation resistance are improved more by controlling a flat rate of the flat graphite to the range described above.

Further, a softening agent can be added to the elastomer composition described above. Usually, softening agents which are a liquid or have a liquid form at room temperature are suitably used.

The softening agent having the above property can suitably be selected from, for example, various softening agents of a mineral oil base, a synthetic base and the like for rubbers or resins.

In this regard, the mineral oil base softening agents include process oils of a naphthene base, a paraffin base and the like, and among them, preferred is at least one which is selected from non-aromatic oils, particularly paraffin oils and naphthene base oils of a mineral oil base and synthetic polyisobutylene base oils and which has a number average molecular weight of 450 to 5,000.

The above softening agents may be used alone or may be used in a mixture of two or more kinds thereof if they have a good compatibility with each other.

A blending amount of the softening agent shall not specifically be restricted and is selected in a range of usually 1 to 1000 parts by mass, preferably 1 to 500 parts by mass based on 100 parts by mass of the component (A).

If the blending amount is 1 part by mass or more, the hardness can be reduced, and the satisfactory flexibility is obtained when the molding of the tube for transporting a fluid is prepared. On the other hand, if it is 1,000 parts by mass or less, the softening agent can be inhibited from bleeding, and a satisfactory mechanical strength of the molding is obtained.

A blending amount of the above softening agent can suitably be selected in the ranges described above according to a molecular weight of the thermoplastic elastomer and the kind of the other components added to the thermoplastic elastomer.

Further, the above elastomer composition can be blended, if necessary, with a polyphenylene ether resin for the purpose of improving a compression set of the molding obtained.

Publicly known resins can be used as the polyphenylene ether resin, and to be specific, they include poly (2,6-dimethyl-1,4-phenylene ether), poly(2-methyl-6-ethyl-1,4-phenylene ether), poly(2,6-diphenyl-1,4-phenylene ether), poly(2-methyl-6-phenyl-1,4-phenylene ether), poly(2,6-dichloro-1,4-phenylene ether) and the like. Further, capable of being used as well are polyphenylene ether copolymers such as copolymers of 2,6-dimethylphenol with monovalent phenols (for example, 2,3,6-trimethylphenol and 2-methyl-6-butylphenol).

Among them, poly(2,6-dimethyl-1,4-phenylene ether) and copolymers of 2,6-dimethylphenol with 2,3,6-trimethylphenol are preferred, and poly(2,6-dimethyl-1,4-phenylene ether) is preferred.

A blending amount of the polyphenylene ether resin can suitably selected in a range of 10 to 250 parts by mass based on 100 parts by mass of the component (A).

If the above blending amount is 250 parts by mass or less, a hardness of the molding obtained is not increased too much and is kept suitable. On the other hand, if it is 10 parts by mass or more, an effect of improving a compression set of the molding obtained is satisfactory.

Further, the above elastomer composition can be blended, if necessary, with scale-like inorganic additives such as clay, diatomaceous earth, silica, talc, barium sulfate, calcium carbonate, magnesium carbonate, metal oxides, mica, graphite, aluminum oxide and the like, granular or powdery solid fillers such as various metal powders, glass powders, ceramics powders, granular or powder polymers and the like, other various natural or artificial short fibers, long fibers (various polymer fibers and the like) and the like.

Also, it can be reduced in a weight by blending with hollow fillers, for example, inorganic hollow fillers such as glass balloon, silica balloon and the like and organic hollow fillers comprising polyvinylidene fluoride, polyvinylidene fluoride copolymers and the like.

Further, various foaming agents can be mixed therein in order to improve various physical properties such as a reduction in a weight and the like, and gases can mechanically be mixed therein as well in mixing.

Also, the above elastomer composition can be used, if necessary, in combination with other additives including flame retardants, fungicides, hindered amine base light stabilizing agents, UV absorbers, antioxidants, coloring agents, silicone oils, silicone polymers, coumarone resins, coumarone-indene resins, phenol-terpene resins, petroleum base hydrocarbons, various tackifiers such as rosin derivatives and the like, various adhesive elastomers such as Leostomer B (trade name, manufactured by Riken Technos Corporation) and the like and other thermoplastic elastomers or resins such as Hybrar (trade name, manufactured by Kuraray Co., Ltd., a block copolymer in which a polystyrene block is linked with both ends of a vinyl-polyisoprene block), Norex (trade name, manufactured by Zeon Corporation, polynorbornene obtained by subjecting norbornene to ring opening polymerization) and the like.

The silicone polymers described above have a weight average molecular weight of 10,000 or more, preferably 100,000 or more. The silicone polymers described above improve a surface adhesive property of a molding prepared by using the above elastomer composition.

The above silicone polymers blended with general purpose thermoplastic polymers, for example, polyethylene, polypropylene, polystyrene and the like in a high concentration in order to improve a handling property can be used.

In particular, the above silicone polymers blended with polypropylene are good in terms of both of a workability and physical properties.

Materials which are readily available as a general purpose type such as Silicone Concentrate BY27 series marketed by Dow Corning Toray Co., Ltd. may be used as the above material.

A production process for the above elastomer composition shall not specifically be restricted, and publicly known processes can be applied.

It can readily be produced, for example, by melting and kneading the respective components described above and the additive components used if necessary by means of a heating and kneading machine, for example, a single shaft extruding machine, a two shaft extruding machine, a roll, a Banbury mixer, a plastic bender, a kneader, a high shearing type mixer and the like and adding thereto, if necessary, a cross-linking agent such as organic peroxide and a cross-linking auxiliary agent, or mixing the above necessary components at the same time and heating, melting and kneading the mixture.

Also, it can be produced as well by preparing in advance a thermoplastic material obtained by kneading a high molecular organic material and a softening agent and further mixing this material with the same high molecular organic material or at least one different kind of a high molecular organic material.

Further, the above elastomer composition can be cross-linked as well by adding a cross-linking agent such as organic peroxide and a cross-linking auxiliary agent The tube of the present invention for transporting a fluid can be obtained by producing a tube-like molding using the elastomer composition described above by a publicly known method, for example, extrusion molding, injection molding, inflation and the like.

The tube for transporting a fluid thus obtained has the following properties.

An inner diameter of the above tube is suitably selected according to the uses, and it is usually 0.1 to 3 mm, preferably 0.5 to 2 mm.

A wall thickness thereof is, though depending on an inner diameter thereof, usually 0.1 to 2 mm, preferably 0.5 to 1.5 mm.

An air permeability thereof (JIS K7126; A method (pressure difference method), 40° C.) measured by using a sheet having a thickness of 0.5 mm is $120 \times 10^{-5}$ $cm^3/m^2 \cdot 24$ hr·Pa or less, and the above tube has an excellent air permeation resistance.

The above air permeability is preferably $100 \times 10^{-5}$ $cm^3/m^2 \cdot 24$ hr·Pa or less, more preferably $80 \times 10^{-5}$ $cm^3/m^2 \cdot 24$ hr·Pa or less and further preferably $50 \times 10^{-5}$ $cm^3/m^2 \cdot 24$ hr·Pa or less.

Further, a vapor permeability thereof (JIS Z0208; 40° C., 90% RH) measured by using a sheet having a thickness of 0.5 mm is usually 2.0 $g/m^2 \cdot 24$ hr or less, and the above tube is excellent as well in a barrier property against vapor.

The above vapor permeability is preferably 1.2 $g/m^2 \cdot 24$ hr or less, more preferably 1.0 $g/m^2 \cdot 24$ hr or less.

EXAMPLES

Next, the present invention shall be explained in further details with reference to examples, but the present invention shall by no means be restricted by these examples.
Evaluation Methods:
(1) Rigidity:

Evaluated by the presence of a kink generated when a tube comprising the respective compositions shown in Table 1 was bent at a radius of 10 mm. The evaluation was carried out according to the following criteria. The measurement results thereof are shown in Table 1.
○: no kink generated
X: kink generated
(2) Vapor Permeability:

Measured according to JIS Z0208 using a sheet of 0.5 mm. The measurement results thereof are shown in Table 1.
(3) Gas Permeability:

Measured according to JIS K7126 A method (pressure difference method) 40° C. using a sheet of 0.5 mm. The measurement results thereof are shown in Table 1.
(4) Flat Rate (Aspect Ratio):

A stratiform or tabular inorganic filler was observed under an electron microscope to measure a major length and a minor length of optional 50 particles, and the flat rate was determined from an equation of a/b, wherein a was an average major length, and b was an average minor length.
(5) Breaking Strength (Tb), Breaking Elongation (Eb) and 100% Modulus (M100);

The breaking strength (Tb), the breaking elongation (Eb) and the 100% modulus (M100) were measured according to JIS K7113 (tensile test method of plastics). The measurement results thereof are shown in Table 1.
(6) Hardness:

Measured according to JIS K6253. The measurement results thereof are shown in Table 1.
(7) Melt Flow Rate (MFR):

A flow amount (g) in 10 minutes was measured on the condition of 190° C.×5.325 kg according to JIS K7210. The measurement results thereof are shown in Table 1.

Example 1

A composition prepared by blending 5 parts by mass of polypropylene ("H-700" manufactured by Idemitsu Kosan Co., Ltd.) and 5 parts by mass of flat graphite ("SGP-10" manufactured by SEC Carbon Ltd.) with 100 parts by mass of a styrene-isobutylene-styrene block copolymer (SIBS: "SIBSTAR 073T" manufactured by Kaneka Corporation, weight average molecular weight Mw=about 70,000, styrene block content: 30% by mass) was used to prepare a tube having a minor diameter of 1.0 mm, a thickness of 0.5 mm, a length of 100 mm and a major diameter of 2 mm on the production conditions of a metal die temperature of 80° C. and a resin temperature of 180° C. by a hot press method and a sheet of thickness 0.5 mm×100 mm×100 mm by extrusion molding. The sheet was used to measure a vapor permeability and an air permeability, and the tube was used to measure a rigidity. The results thereof are shown in Table 1.

Example 2

The same procedure as in Example 1 was carried out, except that 20 parts by mass of flat graphite was blended. The sheet was used to measure a vapor permeability and an air permeability, and the tube was used to measure a rigidity. The results thereof are shown in Table 1.

Example 3

The same procedure as in Example 1 was carried out, except that 50 parts by mass of flat graphite was blended. The sheet was used to measure a vapor permeability and an air permeability, and the tube was used to measure a rigidity. The results thereof are shown in Table 1.

Example 4

The same procedure as in Example 1 was carried out, except that 5 parts by mass of flat graphite ("SGP-10" manufactured by SEC Carbon Ltd.) was changed to 5 parts by mass of flat graphite ("SGP-3" manufactured by SEC Carbon Ltd.). The sheet was used to measure a vapor permeability and an air permeability, and the tube was used to measure a rigidity. The results thereof are shown in Table 1.

Example 5

The same procedure as in Example 1 was carried out, except that 20 parts by mass of flat graphite ("SGP-10" manufactured by SEC Carbon Ltd.) was changed to 20 parts by mass of flat graphite ("SGP-3" manufactured by SEC Carbon Ltd.). The sheet was used to measure a vapor permeability and an air permeability, and the tube was used to measure a rigidity. The results thereof are shown in Table 1.

Example 6

The same procedure as in Example 1 was carried out, except that 50 parts by mass of flat graphite ("SGP-10" manufactured by SEC Carbon Ltd.) was changed to 50 parts by mass of flat graphite ("SGP-3" manufactured by SEC Carbon Ltd.). The sheet was used to measure a vapor permeability and an air permeability, and the tube was used to measure a rigidity. The results thereof are shown in Table 1.

Example 7

The same procedure as in Example 1 was carried out, except that 5 parts by mass of flat graphite ("SGP-10" manufactured by SEC Carbon Ltd.) was changed to 5 parts by mass of flat graphite ("SGP-100" manufactured by SEC Carbon Ltd.). The sheet was used to measure a vapor permeability and an air permeability, and the tube was used to measure a rigidity. The results thereof are shown in Table 1.

Example 8

The same procedure as in Example 1 was carried out, except that 20 parts by mass of flat graphite ("SGP-10" manufactured by SEC Carbon Ltd.) was changed to 20 parts by mass of flat graphite ("SGP-100" manufactured by SEC Carbon Ltd.). The sheet was used to measure a vapor permeability and an air permeability, and the tube was used to measure a rigidity. The results thereof are shown in Table 1.

Example 9

The same procedure as in Example 1 was carried out, except that 50 parts by mass of flat graphite ("SGP-10" manufactured by SEC Carbon Ltd.) was changed to 50 parts by mass of flat graphite ("SGP-100" manufactured by SEC Carbon Ltd.). The sheet was used to measure a vapor permeability and an air permeability, and the tube was used to measure a rigidity. The results thereof are shown in Table 1.

Comparative Example 1

The same procedure as in Example 1 was carried out, except that 20 parts by mass of polypropylene and 23 parts by mass of polybutene "HV300" were blended and that flat graphite was not blended. The sheet was used to measure a vapor permeability and an air permeability, and the tube was used to measure a rigidity. The results thereof are shown in Table 1.

Comparative Example 2

The same procedure as in Example 1 was carried out, except that flat graphite was not blended. The sheet was used to measure a vapor permeability and an air permeability, and the tube was used to measure a rigidity. The results thereof are shown in Table 1.

Comparative Example 3

The same procedure as in Example 1 was carried out, except that 20 parts by mass of clay ("Smectite F" manufactured by Kunimine Industries Co., Ltd.) was blended and that flat graphite was not blended. The sheet was used to measure a vapor permeability and an air permeability, and the tube was used to measure a rigidity. The results thereof are shown in Table 1.

TABLE 1

| Blend | | Comparative Example | | | Example | | | | | | | | |
|---|---|---|---|---|---|---|---|---|---|---|---|---|---|
| | | 1 | 2 | 3 | 1 | 2 | 3 | 4 | 5 | 6 | 7 | 8 | 9 |
| SIBS*[1] SIBSTAR 073T | | 100 | 100 | 100 | 100 | 100 | 100 | 100 | 100 | 100 | 100 | 100 | 100 |
| PP*[2] H-700 | | 20 | 5 | 5 | 5 | 5 | 5 | 5 | 5 | 5 | 5 | 5 | 5 |
| Polybutene*[3] HV300 | | 23 | — | — | — | — | — | — | — | — | — | — | — |
| Flat graphite*[4] SPG-3, average particle diameter: 3 μm, flat rate: 5 | | — | — | — | — | — | — | 5 | 20 | 50 | — | — | — |
| Flat graphite*[5] SPG-10, average particle diameter: 15 μm, flat rate: 5 | | — | — | — | 5 | 20 | 50 | — | — | — | — | — | — |
| Flat graphite*[6] SPG-100, average particle diameter: 100 μm, flat rate: 50 | | — | — | — | — | — | — | — | — | — | 5 | 20 | 50 |
| Clay Smectite F*[7] average particle diameter: 5 μm, flat rate: 50 | | — | — | 20 | — | — | — | — | — | — | — | — | — |
| Hardness | (°) | 51 | 53 | 84 | 59 | 65 | 74 | 58 | 65 | 75 | 59 | 62 | 69 |
| MFR | (g/10 minutes, 190° C. × 5.325 kg) | 25 | 6.4 | 0.9 | 62 | 3.7 | 1.4 | 5.9 | 2.9 | 0.69 | 6.8 | 5.2 | 2.5 |
| T.B | (MPa) | 6.0 | 10.0 | 2.3 | 9.7 | 8.1 | 5.6 | 12.4 | 10.4 | 12.2 | 11.8 | 9.1 | 6.0 |
| E.B | (%) | 510 | 540 | 100 | 450 | 400 | 120 | 500 | 370 | 170 | 460 | 420 | 320 |
| M100 | (MPa) | 1.6 | 1.2 | — | 2.1 | 3.3 | 5.1 | 2.1 | 4.2 | 10.2 | 1.9 | 2.4 | 3.6 |
| Vapor permeability | (g/m$^2$ · 24 h) | 1.5 | 1.2 | 18.0 | 1.0 | 0.72 | 0.51 | 1.1 | 0.8 | 0.6 | 1.1 | 0.6 | 0.4 |
| Air permeability | (10$^{-5}$ cm$^3$/m · 24 h · Pa) | 170 | 130 | 20 | 120 | 75 | 38 | 100 | 77 | 49 | 106 | 89 | 40 |
| Rigidity | | X | ○ | X | ○ | ○ | ○ | ○ | ○ | ○ | ○ | ○ | ○ |

Remarks:
*[1]styrene-isobutylene-styrene block copolymer; (SIBS: "SIBSTAR073T" manufactured by Kaneka Corporation, weight average molecular weight Mw = about 70,000, styrene block content: 30% by mass)
*[2]polypropylene; ("H-700" manufactured by Idemitsu Kosan Co., Ltd.)
*[3]polybutene; ("HV300" manufactured by Idemitsu Kosan Co., Ltd.)
*[4]flat graphite; ("SGP-3" manufactured by SEC Carbon Ltd.), average particle diameter: 3 μm, flat rate: 5
*[5]flat graphite; ("SGP-10" manufactured by SEC Carbon Ltd.), average particle diameter: 15 μm, flat rate: 5
*[6]flat graphite; ("SGP-100" manufactured by SEC Carbon Ltd.), average particle diameter: 100 μm, flat rate: 5
*[7]clay; ("Smectite F" manufactured by Kunimine Industries Co., Ltd.), average particle diameter: 5 μm, flat rate: 50

INDUSTRIAL APPLICABILITY

The tube of the present invention for transporting a fluid is provided with a satisfactory flexibility and improved in a vapor permeability and an air permeability at the same time by a simple method in which a thermoplastic elastomer is blended with graphite which is a carbon base filler, and it is suited to uses of a tube for transporting a fluid for transporting coolant, transporting gas, chemical medicines, medical care, transporting beverage, transporting ink and the like.

What is claimed is:

1. A tube for transporting a fluid, comprising a composition comprising (A) a thermoplastic elastomer, (B) 1 to 50 parts by mass of flat-shaped graphite based on 100 parts by mass of the thermoplastic elastomer, and (C) 0.1 to 50 parts by mass of a polyolefin resin based on 100 parts by mass of the thermoplastic elastomer, wherein the flat-shaped graphite has an average particle diameter of 1 to 100 μm, and an aspect ratio thereof is 1≤aspect ratio≤5, wherein the thermoplastic elastomer of the component (A) is a polystyrene base thermoplastic elastomer in which a principal chain of a soft segment comprises a saturated bond, wherein the polystyrene base thermoplastic elastomer of the component (A) is at least one selected from the group consisting of a styrene-isobutylene-styrene block copolymer (SIBS), a styrene-ethylene/butylene-styrene block copolymer (SEBS) and a styrene-ethylene/propylene-styrene block copolymer (SEPS), and wherein a sheet of said composition having a thickness of 0.5 mm has an air permeability of $120 \times 10^{-5}$ $cm^3/m^2 \cdot 24$ hr·Pa or less.

2. The tube for transporting a fluid according to claim 1, wherein a sheet of said composition having a thickness of 0.5 mm has a vapor permeability of 1.2 $cm^3/m^2 \cdot 24$ hr or less.

3. The tube for transporting a fluid according to claim 1, wherein the polyolefin resin of the component (C) is selected from the group consisting of polyethylene, isotactic polypropylene and a copolymer of propylene with an α-olefin.

* * * * *